US010699055B2

(12) United States Patent
Sha et al.

(10) Patent No.: US 10,699,055 B2
(45) Date of Patent: Jun. 30, 2020

(54) GENERATIVE ADVERSARIAL NETWORKS FOR GENERATING PHYSICAL DESIGN LAYOUT PATTERNS

(71) Applicant: International Business Machines Corporation, Armonk, NY (US)

(72) Inventors: Jing Sha, White Plains, NY (US); Michael A. Guillorn, Cold Springs, NY (US); Martin Burkhardt, White Plains, NY (US); Derren N. Dunn, Sandy Hook, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/005,999

(22) Filed: Jun. 12, 2018

(65) Prior Publication Data
US 2019/0377849 A1  Dec. 12, 2019

(51) Int. Cl.
*G06F 30/398* (2020.01)
*G06N 3/04* (2006.01)
(Continued)

(52) U.S. Cl.
CPC ......... *G06F 30/398* (2020.01); *G06N 3/0454* (2013.01); *G06N 3/088* (2013.01); *G06F 2111/20* (2020.01); *G06F 2119/18* (2020.01)

(58) Field of Classification Search
CPC ............. G06F 17/5081; G06F 2217/12; G06F 2217/02; G06F 2111/20; G06F 2119/18;
(Continued)

(56) References Cited

U.S. PATENT DOCUMENTS 7,930,667 B2   4/2011  Bergman Reuter et al.
9,122,828 B2   9/2015  Chiang et al.
(Continued)

OTHER PUBLICATIONS

A. Hamouda et al., "Enhanced OPC Recipe Coverage and Early Hotspot Detection Through Automated Layout Generation and Analysis," Proceedings of SPIE, Optical Microlithography XXX, Mar. 24, 2017, 9 pages, vol. 10147.
(Continued)

*Primary Examiner* — Vuthe Siek
(74) *Attorney, Agent, or Firm* — Vazken Alexanian; Ryan, Mason & Lewis, LLP

(57) ABSTRACT

A method for generating physical design layout patterns includes selecting as training data a set of physical design layout patterns of features in a given layer of a given patterned structure and converting the physical design layout patterns into two-dimensional (2D) arrays comprising entries for different locations in the given layer of the given patterned structure with values representing presence of the features at the different locations. The method also includes training, utilizing the 2D arrays, a generative adversarial network (GAN) comprising a discriminator neural network and a generator neural network. The method further includes generating one or more synthetic 2D arrays utilizing the trained generator neural network of the GAN, a given synthetic 2D array comprising entries for different locations in the given layer of a new physical design layout pattern with values representing presence of the features at the different locations of the new physical design layout pattern.

25 Claims, 10 Drawing Sheets

(51) Int. Cl.
*G06N 3/08* (2006.01)
*G06F 111/20* (2020.01)
*G06F 119/18* (2020.01)

(58) Field of Classification Search
CPC .... G06F 30/398; G06N 3/0454; G06N 3/088; G06N 3/0445; G06N 3/0472; G06N 3/0481; G06N 3/08
See application file for complete search history.

(56) References Cited

U.S. PATENT DOCUMENTS

| | | | |
|---|---|---|---|
| 9,626,459 | B2 | 4/2017 | Agarwal et al. |
| 2015/0286766 | A1 | 10/2015 | Singh et al. |
| 2016/0180263 | A1 | 6/2016 | Mourra |
| 2016/0328644 | A1 | 11/2016 | Lin et al. |
| 2016/0378902 | A1* | 12/2016 | Graur ................. G06F 17/5081 716/52 |
| 2017/0357911 | A1 | 12/2017 | Liu et al. |
| 2018/0275523 | A1 | 9/2018 | Biafore et al. |
| 2018/0285510 | A1 | 10/2018 | Lutich |
| 2018/0293205 | A1 | 10/2018 | Koker et al. |
| 2018/0300434 | A1 | 10/2018 | Hu et al. |
| 2019/0138847 | A1* | 5/2019 | Shor ...................... G06K 9/6253 |
| 2019/0139641 | A1* | 5/2019 | Itu ......................... G16H 30/20 |
| 2019/0147134 | A1* | 5/2019 | Wang ................. G06F 17/5081 |
| 2019/0147320 | A1* | 5/2019 | Mattyus .............. G06N 3/0454 382/155 |
| 2019/0188537 | A1* | 6/2019 | Dutta ................... G06K 9/6262 |
| 2019/0204755 | A1 | 7/2019 | Kicken et al. |
| 2019/0220652 | A1* | 7/2019 | Li .......................... G06F 21/32 |
| 2019/0228051 | A1 | 7/2019 | Langhammer et al. |
| 2019/0266479 | A1 | 8/2019 | Singh et al. |
| 2019/0266485 | A1 | 8/2019 | Singh et al. |
| 2019/0266784 | A1 | 8/2019 | Singh et al. |

OTHER PUBLICATIONS

J.-W. Jeon et al., "Early Stage Hot Spot Analysis Through Standard Cell Base Random Pattern Generation," Proceedings of SPIE, Design-Process-Technology Co-optimization for Manufacturability XI, Apr. 4, 2017, 7 pages, vol. 10148.

Andrey Lutich, "PatterNet: A System to Learn Compact Physical Design Pattern Representations for Pattern-Based Analytics," Journal of Micro/Nanolithography, MEMS, and MOEMS, Jul.-Sep. 2017, 7 pages, vol. 16, No. 3.

I.J. Goodfellow et al., "Generative Adversarial Nets," Proceedings of the 27th International Conference on Neural Information Processing Systems (NIPS), Dec. 8-13, 2014, pp. 2672-2680, vol. 2.

A. Radford et al., "Unsupervised Representation Learning with Deep Convolutional Generative Adversarial Networks," arXiv preprint arXiv:1511.06434, Nov. 19, 2015, 16 pages.

T.G. Neogi et al., "Design Space Analysis of Novel Interconnect Constructs for 22NM Fdx Technology," Proceedings of SPIE, Design-Process-Technology Co-optimization for Manufacturability XI, Mar. 30, 2017, 7 pages, vol. 10148.

List of IBM Patents or Patent Applications Treated as Related.

* cited by examiner

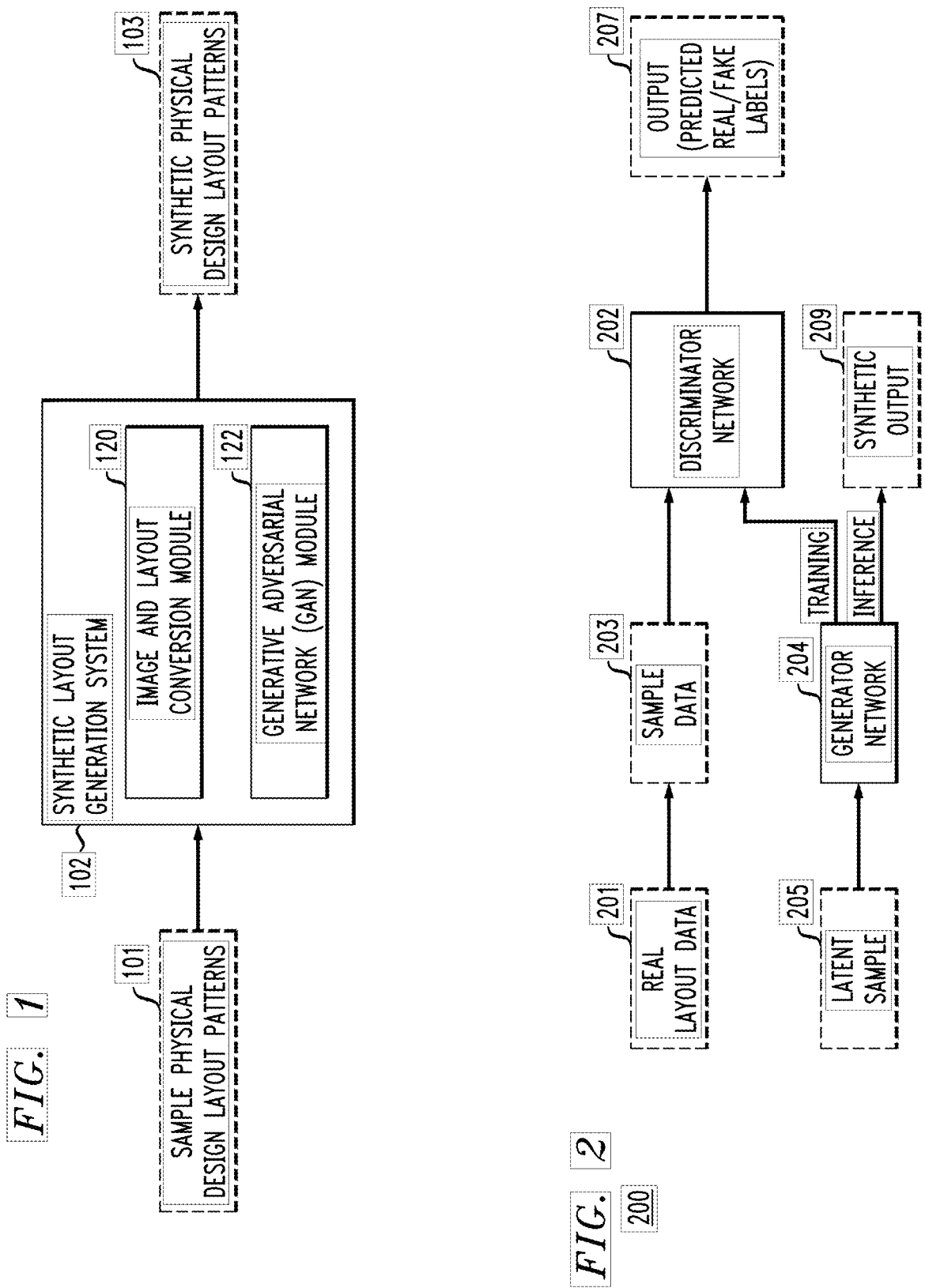

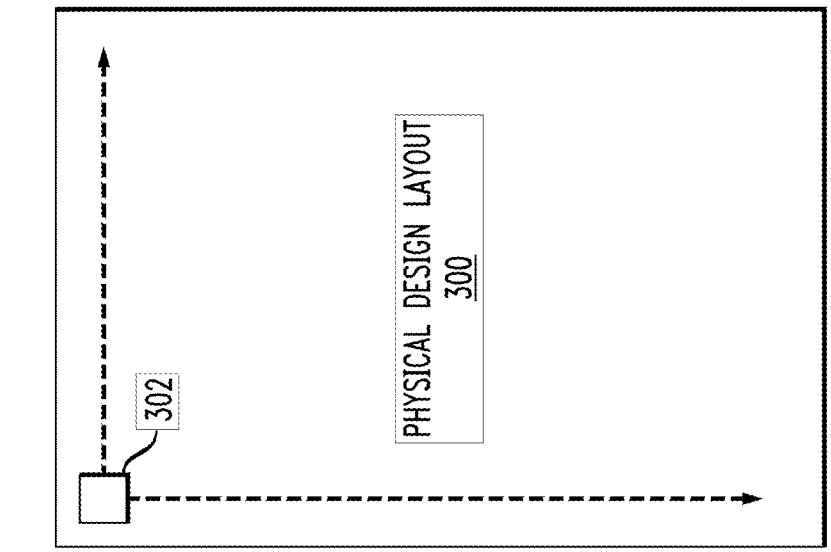

GENERATIVE ADVERSARIAL NETWORKS FOR GENERATING PHYSICAL DESIGN LAYOUT PATTERNS

BACKGROUND

The present application relates to semiconductor manufacturing, and more specifically, to techniques for patterning in semiconductor manufacturing. Patterned structures may include single layer and multi-layer structures. Each layer of a patterned structure may include a number of vias, lines and various other features. Generating and expanding layout pattern libraries for these and other features is useful for evaluating manufacturability.

SUMMARY

Embodiments of the invention provide techniques for generating synthetic physical design layout patterns.

In one embodiment, a method for generating physical design layout patterns comprises the step of selecting as training data a set of physical design layout patterns of features in a given layer of a given patterned structure. The method also comprises the step of converting the physical design layout patterns into two-dimensional arrays, a given two-dimensional array for a given physical design layout pattern comprising entries for different locations in the given layer of the given patterned structure with values representing presence of the features at the different locations. The method further comprises the step of training, utilizing the two-dimensional arrays, a generative adversarial network (GAN) comprising a discriminator neural network and a generator neural network. The method further comprises the step of generating one or more synthetic two-dimensional arrays utilizing the trained generator neural network of the GAN, a given one of the synthetic two-dimensional arrays comprising entries for different locations in the given layer of a new physical design layout pattern with values representing presence of the features at the different locations of the new physical design layout pattern. The method is performed by at least one processing device comprising a processor coupled to a memory.

In another embodiment, a computer program product comprises a computer readable storage medium having program instructions embodied therewith. The program instructions are executable by at least one computing device to cause the at least one computing device to perform the step of selecting as training data a set of physical design layout patterns of features in a given layer of a given patterned structure. The program instructions are also executable by the at least one computing device to cause the at least one computing device to perform the step of converting the physical design layout patterns into two-dimensional arrays, a given two-dimensional array for a given physical design layout pattern comprising entries for different locations in the given layer of the given patterned structure with values representing presence of the features at the different locations. The program instructions are further executable by the at least one computing device to cause the at least one computing device to perform the step of training, utilizing the two-dimensional arrays, a GAN comprising a discriminator neural network and a generator neural network. The program instructions are further executable by the at least one computing device to cause the at least one computing device to perform the step of generating one or more synthetic two-dimensional arrays utilizing the trained generator neural network of the GAN, a given one of the synthetic two-dimensional arrays comprising entries for different locations in the given layer of a new physical design layout pattern with values representing presence of the features at the different locations of the new physical design layout pattern.

In another embodiment, an apparatus comprises a memory and at least one processor coupled to the memory and configured for selecting as training data a set of physical design layout patterns of features in a given layer of a given patterned structure. The processor is also configured for converting the physical design layout patterns into two-dimensional arrays, a given two-dimensional array for a given physical design layout pattern comprising entries for different locations in the given layer of the given patterned structure with values representing presence of the features at the different locations. The processor is further configured for training, utilizing the two-dimensional arrays, a GAN comprising a discriminator neural network and a generator neural network. The processor is further configured for generating one or more synthetic two-dimensional arrays utilizing the trained generator neural network of the GAN, a given one of the synthetic two-dimensional arrays comprising entries for different locations in the given layer of a new physical design layout pattern with values representing presence of the features at the different locations of the new physical design layout pattern.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 1 depicts a system for generating synthetic single-layer physical design layout patterns, according to an exemplary embodiment of the present invention.

FIG. 2 depicts a workflow of a generative adversarial neural network, according to an exemplary embodiment of the present invention.

FIG. 3 depicts physical design layout pattern images clipped from a physical design layout, according to an exemplary embodiment of the present invention.

DETAILED DESCRIPTION

Figure 4:
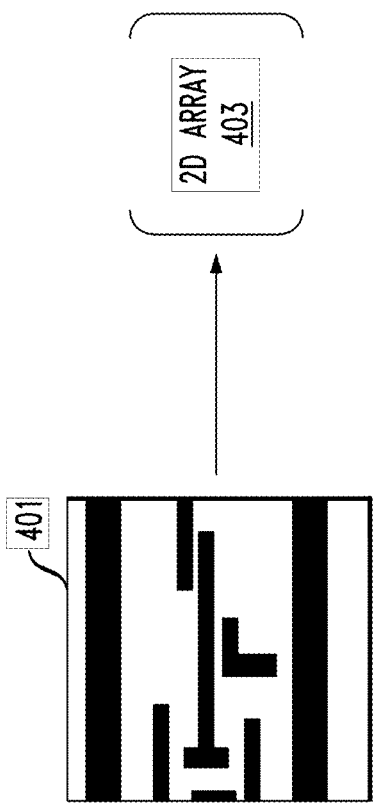
FIG. 4 depicts conversion of a physical design layout pattern image to a format suitable for input to a generative adversarial neural network, according to an exemplary embodiment of the present invention.

Illustrative embodiments of the invention may be described herein in the context of illustrative methods, systems and devices for generating synthetic single-layer physical design layout patterns. However, it is to be understood that embodiments of the invention are not limited to the illustrative methods, systems and devices but instead are more broadly applicable to other suitable methods, systems and devices.

As discussed above, determining possible layouts for vias, lines and other features of patterned structures is useful for evaluating manufacturability. Patterned structures include structures formed in semiconductor manufacturing, which may include various materials including but not limited to semiconductors, metals, oxides, etc. in one or more layers. Generating synthetic layout patterns, as an example, can be a crucial part of early stage hot spot and failure mode analysis, especially when real layout data is limited. Synthetic layout patterns are also useful for design space exploration. For example, in conducting a manufacturability study, it is generally desired to have as many design layouts as possible. Layout patterns for patterned structures are critical for assessing the manufacturability of a patterned structure.

Various embodiments will be described in detail herein with respect to generating single-layer physical design layout patterns. It should be appreciated, however, that such single-layer physical design layout patterns may be combined to form multi-layer integrated layout patterns.

As will be described in further detail below, in some cases it is desired to generate synthetic layout patterns which are "bi-directional" or which include features that are oriented in two or more directions (e.g., horizontal and vertical features such as horizontal and vertical metal lines). Often, real layout patterns are "unidirectional," in that features thereof are substantially oriented in a single direction (e.g., as primarily horizontal or primarily vertical features). There is a growing need for bi-directional layout patterns suitable for evaluating manufacturability of layouts (e.g., for lithographic processing) for advanced patterning technology nodes. Advantageously, some embodiments provide techniques for generating synthetic single-layer physical design layout patterns with bi-directional features based on training data that is unidirectional.

In some scenarios, a design manual is defined and provided for design rule check (DRC). Generating synthetic layout design patterns in such scenarios may involve generating as many DRC-clean or DRC-compliant layout design patterns as possible to evaluate manufacturability. The design rules may include a variety of rules, such as those relating to geometry of patterned features in different layers. Such geometric rules may include rules specifying polygon or other shape parameters for patterned features, minimum and/or maximum spaces between polygons, rectangles and other shapes of such patterned features, etc. In some embodiments, the design rule checks include removing non-Manhattan shapes (e.g., shapes that do not comply with Manhattan distance geometry), design rule violating polygons, etc.

In other scenarios, only limited real physical design layout data is provided as input. For example, real physical design layout data may include training layout patterns which are unidirectional while it is desired to generate bi-directional layout patterns. Generating synthetic layout patterns in such scenarios may include generating layout patterns that look similar to but are not the same as the input or real data, so as to expand a layout pattern library, evaluate manufacturability, etc. It should be appreciated that some embodiments may combine these and other scenarios.

One way to generate layouts is to use Electronic Design Automation (EDA) tools or other software. Such tools and software, however, are generally limited in that pattern generation is based on predefined building blocks and hard-coded rules to generate reasonable layout patterns.

Another way to generate layouts is through manual scripting and polygon maneuvering by human pattern designers. Such approaches, however, are limited by the designers' understanding of layouts and are limited in generating large-scale synthetic data. These and other approaches require significant manual effort (e.g., human manipulations), which is error prone and has limited scalability.

Embodiments provide techniques for generating synthetic single-layer physical design layout patterns, also referred to herein as synthetic physical design layout patterns or synthetic layout patterns, that overcome these and other disadvantages, through building a model based on generative adversarial networks (GANs). Such a model may be used to automatically generate, in any scale, synthetic physical design layout patterns that look like real or input layout patterns thus expanding pattern libraries. In some embodiments, physical design layouts may be converted to designated data formats for input to a GAN, and the output data format of the GAN may be converted as desired (e.g., for use in particular EDA software) as described in further detail below.

Advantageously, GANs are used in some embodiments to produce realistic synthetic physical design layout patterns, as GANs can produce synthetic physical design layout patterns that look like real data. In some embodiments, GANs are configured to generate synthetic physical design layout patterns with bi-directional features, even where the real or training data includes physical design layout patterns with unidirectional features. Embodiments also provide advantages through automation, which removes the need for human intervention in inference (e.g., generation of synthetic data) after training the GAN model. GAN models used in some embodiments further provide scalability, as trained GANs can generate new patterns quickly. The use of a GAN model further provides for cumulative learning, in that the GAN model becomes more versatile with more diverse real data as training input. GAN models described herein may find use in various application areas, such as for EDA, semiconductor foundries, etc.

GANs are a type of neural network that includes two networks, a generator (generative) network and a discriminator (adversarial) network. The generator network takes random input values and transforms them into a desired output, such as a synthetic physical design layout pattern. A synthetic physical design layout pattern in some embodiments may take the form of a two-dimensional (2D) array as described in further detail below.

The discriminator network distinguishes between real and synthetic data, or between real and synthetic physical design layout patterns. After training the generator and discriminator networks competitively, neither network should be able to make further progress against the other. In other words, at the end of training the generator network becomes so good that the discriminator network cannot distinguish between the synthetic physical design layout patterns and the real physical design layout patterns. During inference, the generator network can be used as a standalone model to generate new synthetic physical design layout patterns, which will be similar to real or input physical design layout patterns though the synthetic layout patterns may include bi-directional features where some or all of the real or input layout patterns include unidirectional features.

Embodiments provide for data preparation such that a layout pattern image may be input to a GAN. In some embodiments, the input for the GAN is a set of 2D arrays representing different layout patterns. Each of the layout pattern images may represent a portion of a larger layout (e.g., each layout pattern image may represent a field of view (FOV) of a larger physical design layout as will be described in further detail below). The layout pattern images may be represented as a 2D array of numbers.

FIG. 1 shows a system 102 for generating synthetic physical design layout patterns. The system 102 includes an image and layout conversion module 120, also referred to as a conversion module 120. As will be described in further detail herein, the conversion module 120 can convert between images of layout patterns and desired layout formats. During training of a GAN, the conversion module 120 may convert input or sample physical design layout patterns 101 into a format utilized by a discriminator network of the GAN (e.g., 2D arrays). In some embodiments, the input to the system 102 is in the form of an overall layout, which includes multiple layout patterns. The conversion module 120 may thus be further configured to capture physical design layout pattern images for different FOVs of the overall layout.

During inference, synthetic physical design layout patterns 103 are produced by the generator network of the GAN (e.g., as 2D arrays). The synthetic physical design layout patterns 103 may be converted from 2D arrays to a desired layout format by conversion module 120 before output. Each physical design layout pattern may be for a particular FOV, where a whole layout may be divided into many FOVs.

The conversion module 120 provides appropriately formatted or converted physical design layout patterns to the GAN module 122. The GAN module 122 may be trained on the input data (e.g., the physical design layout pattern arrays produced from the input 101 by the conversion module 120). After training, the GAN module 122 uses the generator network to generate synthetic physical design layout patterns 103 as output. In some embodiments, the synthetic physical design layout patterns 103 are provided in a desired format as described in further detail below, such as via conversion using the conversion module 120. Thus, the output of the GAN module 122 may be provided back to the conversion module 120 for conversion (e.g., from a 2D array to a desired layout pattern format).

FIG. 2 shows an example workflow of using a GAN 200, which includes a discriminator network 202 and a generator network 204. Real layout data 201 is provided as input, which may be converted into sample data 203 prior to being provided to the discriminator network 202. The conversion of input, such as layout files or images to 2D arrays described herein, is an example of conversion from real data 201 to sample data 203. Latent sample data 205, which may take the form of randomly generated information (e.g., a noise vector), is provided to the generator network 204.

The generator network 204, during training, provides generated or synthetic data to the discriminator network 202. The discriminator network 202 is trained to output predicted labels 207, i.e. "real" (e.g., sample data 203) and "fake" (e.g., synthetic data from the generator network 202).

After training, the concept of the GAN is that the generator network 204 will become so good at generating synthetic data that the discriminator network 202 will not be able to distinguish between the sample data 203 and the synthetic data from the generator network 204. Thus, during inference the trained generator network 204 produces synthetic output 209 that is not distinguishable from the real layout data 201 from the perspective of the discriminator network 202.

FIG. 3 illustrates capture of layout patterns from a physical design layout 300. FIG. 3 shows a top-down view of a physical design layout 300, as well as a number of physical design layout patterns 301 captured therefrom. The physical design layout patterns 301 are clipped out at different locations of the physical design layout 300 in a FOV 302. As shown, there are K rows and M columns of physical design layout patterns 301 clipped from the physical design layout 300.

FIG. 4 shows an example conversion of a single-layer physical design layout pattern image 401 to a format suitable for input to the GAN, such as a 2D array 403. The 2D array 403 may have a size of W×H, where W represents a width of the FOV and H represents a height of the FOV. Although FIG. 4 shows the single-layer physical design layout pattern image 401 as a black-and-white image, it should be appreciated that the image may be a color or grayscale image as desired. The 2D array 403 has a number of entries corresponding to different positions (e.g., pixels) of the image 401. For example, to convert the black-and-white image 401 to the 2D array 403, a value of 1 may be used to denote black (e.g., the presence of a feature in the physical design layout pattern) and a value of 0 may be used to denote white (e.g., the absence of a feature in the physical design layout pattern).

Patterned structures may include various types of features, possibly in different layers thereof. Various embodiments are described herein in the context of metal line features, but embodiments are not so limited and the patterned structures (including layout patterns thereof) may include numerous different and other types of features. For example, metal and via features may be part of back-end-of-line (BEOL) layers. Other features may be present in front-end-of-line (FEOL) layers, such as active areas, poly, etc.

It should be appreciated that layout pattern images are not limited to being black and white images, or to being represented as 2D arrays of binary values. The layout pattern images may be color images, grayscale images, etc., and the 2D arrays may include, for example, continuous values. In some embodiments, the arrays input to the GAN (e.g., the training data) are in the form of 2D arrays of binary values, but the generated output arrays (e.g., the synthetic data) contain continuous numbers. Thresholds may be applied during post-processing to make the continuous values binary before conversion to a desired layout format.

Figure 5:
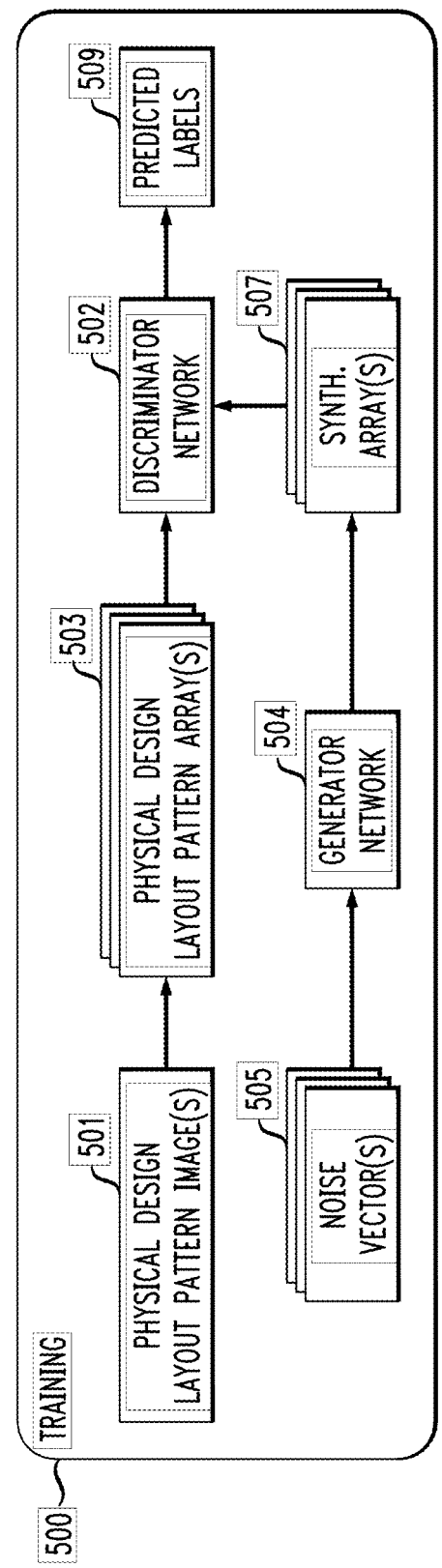
FIG. 5 depicts a training workflow of a generative adversarial neural network, according to an exemplary embodiment of the present invention.

FIG. 5 shows a more detailed view of a training workflow 500 of a GAN. During training, existing physical design layout images 501 are provided as the input or real data, and are converted to physical design layout pattern arrays 503 suitable for processing by discriminator network 502, such as using the techniques described above with respect to FIG. 4. Noise vectors 505 are provided to generator network 504, which generates synthetic arrays 507 provided to the discriminator network 502. The discriminator network 502 outputs predicted labels 509 for the physical design layout pattern arrays 503 and the synthetic arrays 507 (e.g., indicating whether the discriminator network 502 views respective ones of each as "real" or "fake"). The discriminator network 502 and generator network 504 are optimized simultaneously, until the discriminator network 502 is unable to distinguish between the "real" and "fake" data, or between the physical design layout pattern arrays 503 and the synthetic arrays 507.

It should be noted that optimizing or tuning the GAN comprising discriminator network 502 and generator network 504, unlike other types of neural network architectures, is not necessarily limited to using a single accuracy or performance target for optimization. Instead, in some embodiments optimizing the discriminator network 502 and generator network 504 of the GAN seeks to achieve a balance between performance of the discriminator network 502 and generator network 504. In some embodiments, "optimization" or the discriminator network 502 not being able to distinguish between "real" and "fake" data may be subject to some threshold level of accuracy in the predicted labels 509, and is not meant to imply that after training the discriminator network 502 is never able to successfully recognize that one or more of the synthetic arrays 507 produced by generator network 504 is "fake."

Figure 6:
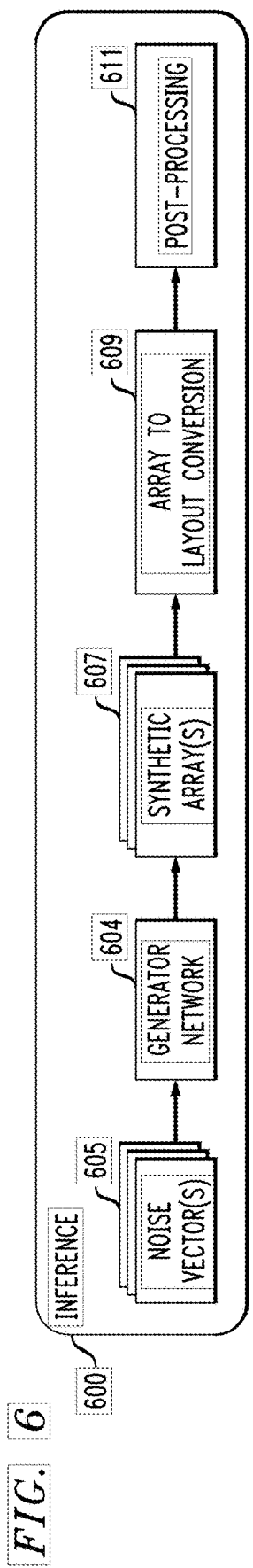
FIG. 6 depicts an inference workflow using a trained generative adversarial neural network, according to an exemplary embodiment of the present invention.

FIG. 6 shows a more detailed view of an inference workflow 600 using a trained GAN, or more particularly the trained generator network 604 of a GAN. Similar to the training workflow 500 described above, noise vectors 605 are provided to the generator network 604, which generates synthetic arrays 607. The synthetic arrays 607 produced during inference 600, however, are not compared against real data by a discriminator network as it is assumed that the trained generator network 604 is good enough to "fool" the discriminator network of the GAN and thus there is no need to pass the synthetic arrays 607 to the discriminator network. Instead, the synthetic arrays 607 are converted 609 to a desired layout format. In some embodiments, the conversion 609 of the synthetic arrays 607 is from a 2D array to an Open Artwork System Interchange Standard (OASIS) format (.oas) or Graphic Database System (GDS) format (.gds). The input data, before conversion, may also be in the OASIS or GDS layout design format.

Post-processing 611 may include polygon post-processing and DRC. The polygon post-processing may include removing or correcting non-Manhattan shapes (e.g., shapes having edges not parallel to x- and y-axes) in an output layout pattern. As mentioned above, the post-processing may further include converting continuous values of the synthetic 2D arrays to binary values prior to conversion to the layout format. DRC during post-processing 611 ensures that the synthetic layout patterns meet specified design rules for layout patterns in a particular use case that may not be captured during training.

Figure 7:
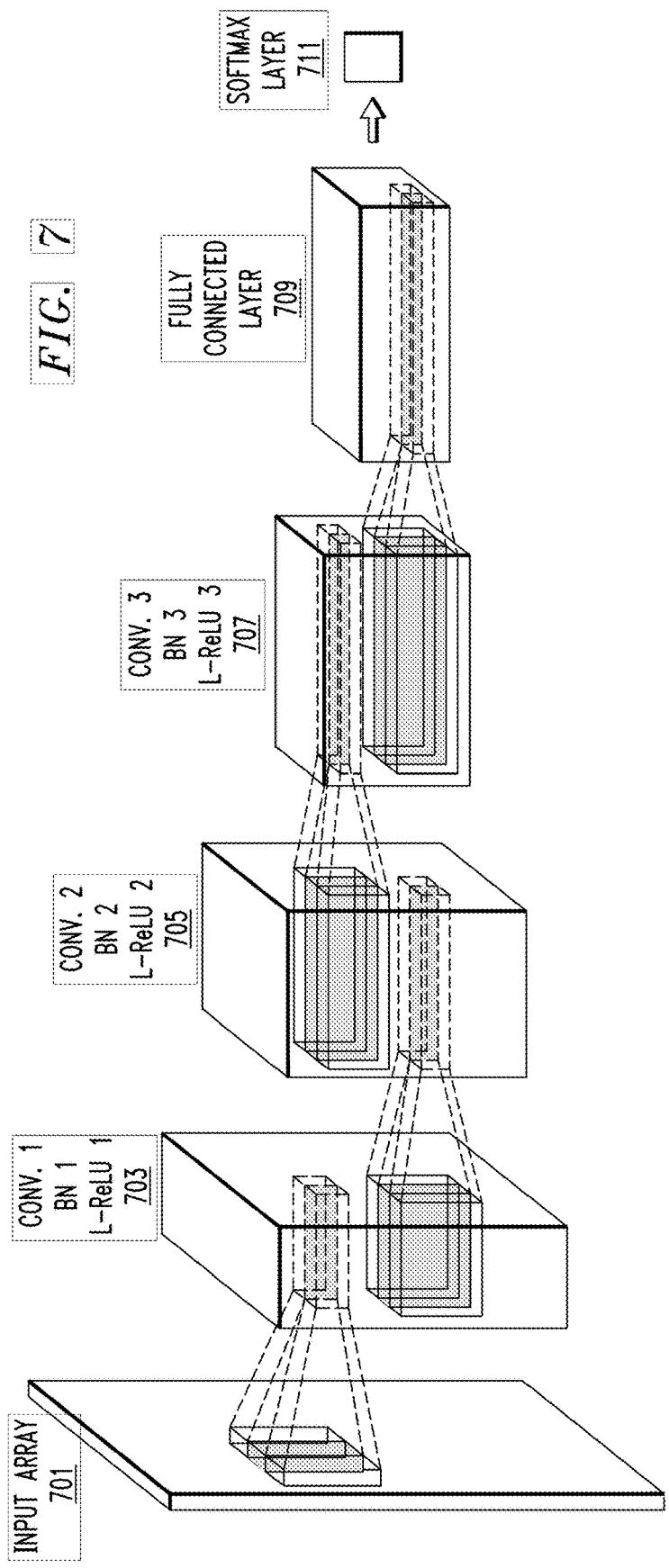
FIG. 7 depicts an architecture of a discriminator network of a generative adversarial neural network, according to an exemplary embodiment of the present invention.

FIG. 7 shows an architecture of a discriminator network of a GAN. The discriminator network in the FIG. 7 example is implemented as a convolutional neural network (CNN). It should be appreciated, however, that various other architectures for the discriminator network of a GAN may be used in other embodiments, including but not limited to fully connected neural networks, recurrent neural networks (RNNs), etc.

The discriminator network includes an input layer 701, which provides a 2D array representing a layout pattern as described herein. The discriminator network also includes a series of layers 703, 705 and 707. Each of the layers 703, 705 and 707 more particularly includes a convolutional (CONV.) layer, batch normalization (BN) and leaky-rectified linear unit (L-ReLU) activation function as shown. The discriminator network further includes a fully connected (FC) layer 709 and a softmax layer 711. The softmax layer 711 provides an output (e.g., 0 or 1) indicating whether the input 2D array 701 is determined to be "fake" (e.g., output 0) or "real" (e.g., output 1).

Figure 8:
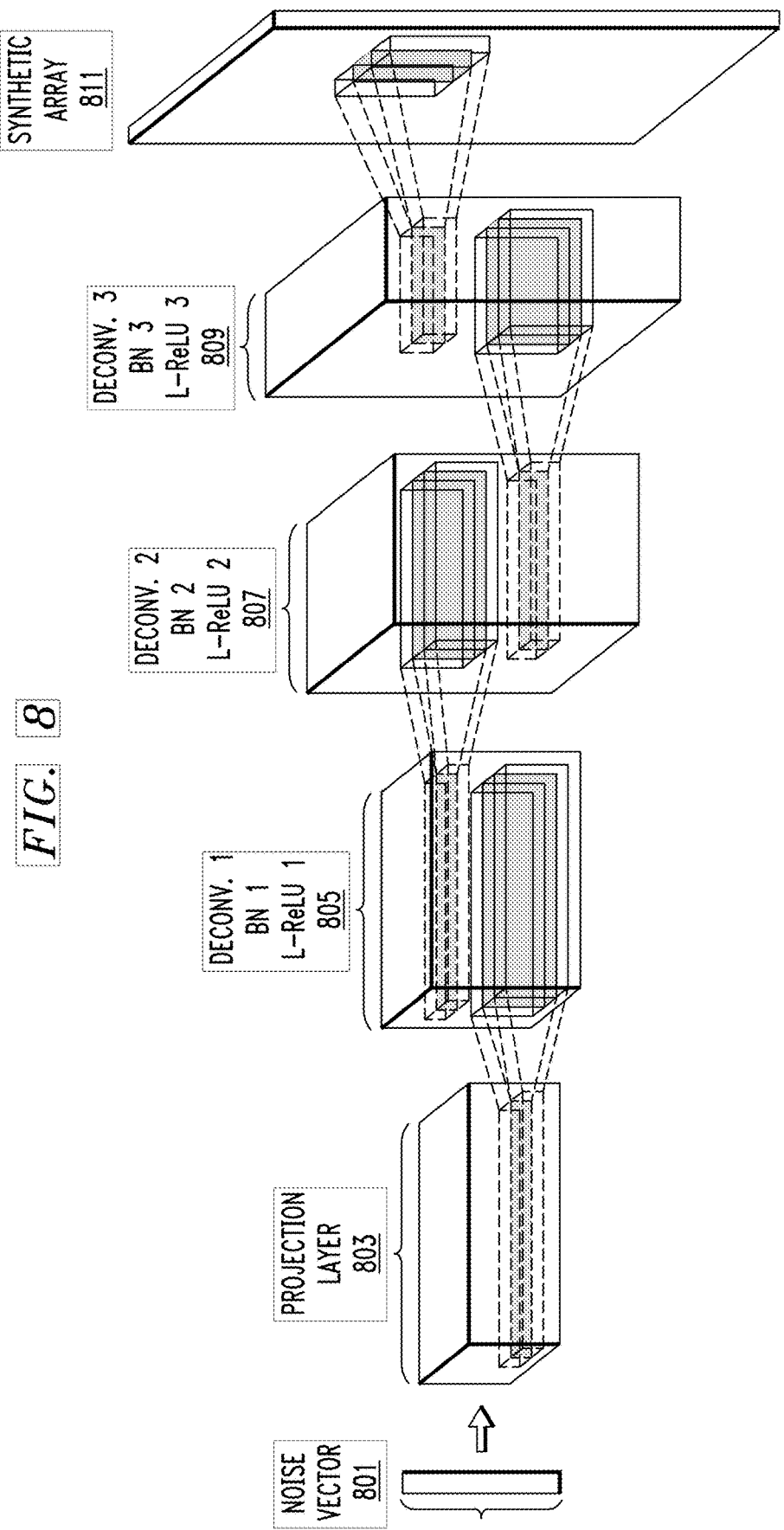
FIG. 8 depicts an architecture of a generator network of a generative adversarial neural network, according to an embodiment of the present invention.

FIG. 8 shows an architecture of a generator network of a GAN. The generator network in the FIG. 8 example is implemented as a CNN. It should be appreciated, however, that various other architectures for the generator network of a GAN may be used in other embodiments, including but not limited to fully connected neural networks, RNNs, etc.

The generator network includes an input layer 801, which provides a noise vector as described herein. The generator network also includes a projection layer 803 and a series of layers 805, 807 and 809. Each of the layers 805, 807 and 809 more particularly includes a deconvolutional (DECONV.) layer, batch normalization (BN) and L-ReLU activation function as shown. The generator network further includes an output layer 811, which outputs a synthetic 2D array representing a synthetic layout pattern.

It should be noted that the particular architectures shown in FIGS. 7 and 8 are presented by way of example only, and that embodiments are not limited to use of the specific examples shown for the discriminator network (FIG. 7) and generator network (FIG. 8). Hyperparameters (e.g., number of neural network layers, type of neural network layers, numbers of neurons for each neural network layer, numbers and sizes of filters, etc.) for GANs (e.g., the discriminator and generator neural networks thereof) can vary as desired. In some embodiments, the particular values for the hyperparameters are based on factors such as the input layout patterns, training accuracy targets, available computing hardware, etc.

In some embodiments, physical design layouts (which may be in an OASIS or GDS format) with a variety of layout patterns are selected for training the GAN. The layout patterns are converted into a set of layout pattern arrays for input to the GAN as training data. In some embodiments, the GAN is built using Python and Tensorflow, an open-source deep learning library. The GAN is then trained using the training data, with fine-tuning of the hyperparameters of the GAN (e.g., the discriminator and generator networks thereof) to achieve desired results. After training, the generator network of the GAN is used to generate synthetic arrays, which may be converted to layout patterns in a desired layout format (e.g., the OASIS or GDS format).

Various conversion techniques may be utilized for converting between a physical design layout pattern and layout pattern arrays described herein. As described above, the output of the generator network of a GAN may be in layout pattern array format, such as a 2D array of values denoting presence or absence of features at different locations in a layer of a patterned structure. Layout pattern formats such as the GDS format, however, are in the form of polygon coordinates. The 2D array output by the generator network of the GAN (e.g., a synthetic layout pattern array) may be converted into a layout pattern in a layout format such as GDS and OASIS by programming scripts. Similarly, layout patterns in the layout format may be converted to 2D arrays or layout pattern arrays as described herein.

As mentioned above, training data for a GAN may take the form of layout patterns that are unidirectional, while it is desired to produce synthetic layout patterns that are bi-directional. In some patterned structures, features such as metal lines are often unidirectional, meaning they are primarily in a single direction such as horizontal or vertical. To meet the design requests for bi-directional physical design layouts at advanced technology nodes, it is desired to produce bi-directional layout patterns, which include features in two directions (e.g., both horizontal and vertical). Real bi-directional layout pattern data, however, is limited. As such, there is a need for techniques to produce synthetic bi-directional layout patterns to expand pattern libraries, for evaluating manufacturability, etc.

Figure 9:
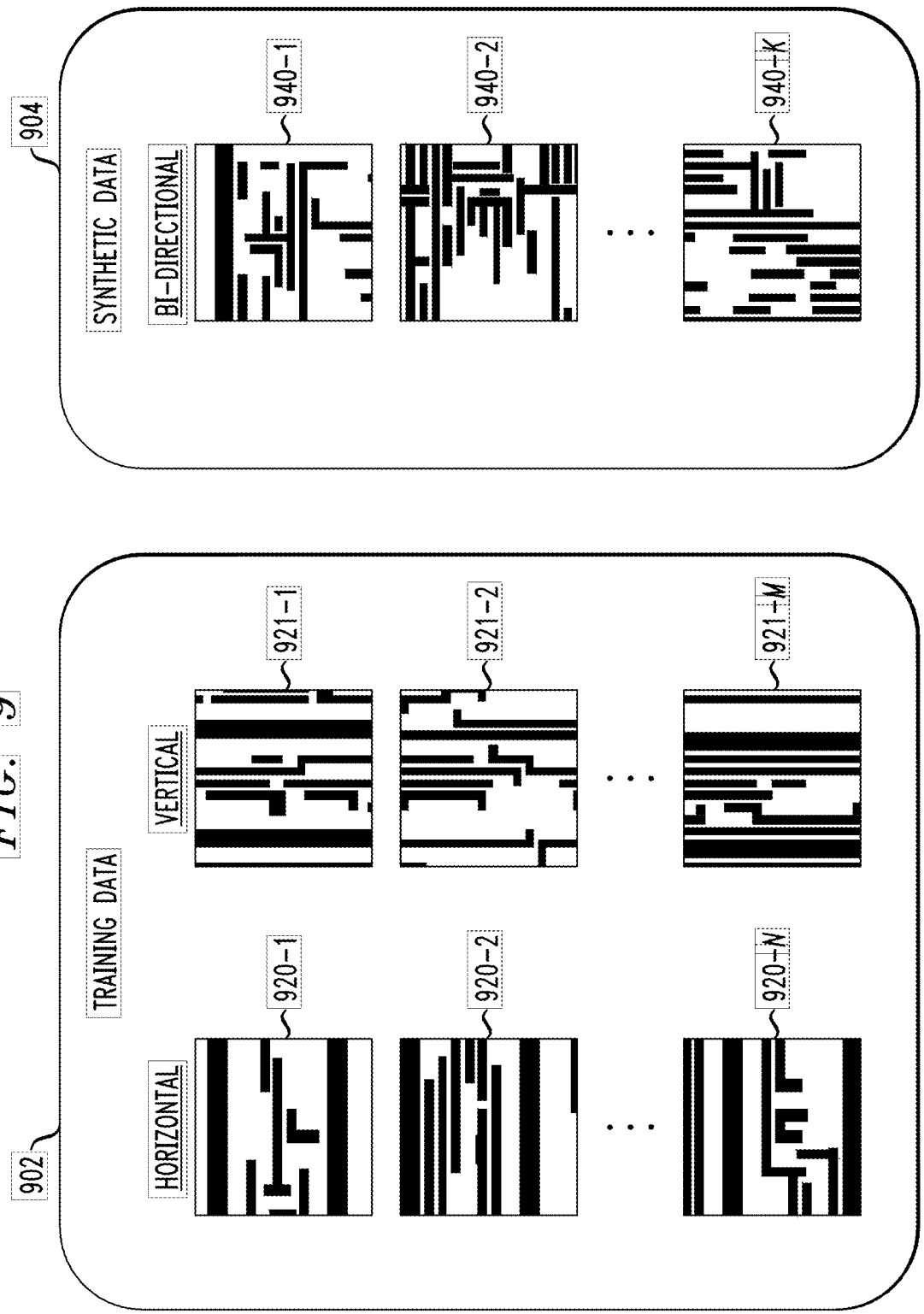
FIG. 9 depicts examples of training and synthetic data, according to an embodiment of the present invention.

FIG. 9 shows an example of training data 902, which includes a first category of training data 920-1, 920-2, ..., 920-N of "horizontal" unidirectional features (e.g., metal lines) and a second category of training data 921-1, 921-2, ..., 921-M of "vertical" unidirectional features (e.g., metal lines). It should be noted that a layout pattern with "unidirectional" features is not limited to having features solely in one direction, but should instead be understood to refer to a layout pattern where features of a particular type are substantially or primarily in a single direction. For example, a layout pattern may be considered to have unidirectional features where a designated threshold percentage (e.g., 80%) of the number or volume of such features is in a single direction. This is illustrated in the training data 902 shown in FIG. 9, where the horizontal layout patterns 920 and vertical layout patterns 921 include primarily but not necessarily solely horizontal and vertical features, respectively. For example, horizontal training layout patterns 920-1 and 920-3 include some vertical features and vertical training layout patterns 921 each include some horizontal features.

FIG. 9 also shows synthetic data 904, which includes synthetic bi-directional layout patterns 940-1, 940-2, ..., 940-K produced by a GAN given the training data 904. As illustrated, the synthetic data 904 includes bi-directional layout patterns 940 that do not necessarily include features primarily or substantially oriented in a single direction. Instead, the bi-directional layout patterns 940 include features in two directions (e.g., in both horizontal and vertical directions).

Performance of a GAN may be tuned based on the training data 902 provided thereto. In some cases, it may be desired to have substantially similar numbers of horizontal training layout patterns 920 and vertical training layout patterns 921. In other words, it may be desired for N to be approximately equal to M such as where the difference between N and M is less than a designated threshold number (e.g., less than 25, less than 10, etc.) or threshold percentage (e.g., where the absolute value of N−M/N+M is less than 0.1, etc.). It should be appreciated that the particular values of these thresholds may vary as desired. It may also be desired to have unequal amounts of horizontal and vertical training layout patterns, so as to skew bi-directional synthetic layout patterns produced by the GAN to include different relative amounts of horizontal and vertical features.

Figure 10:
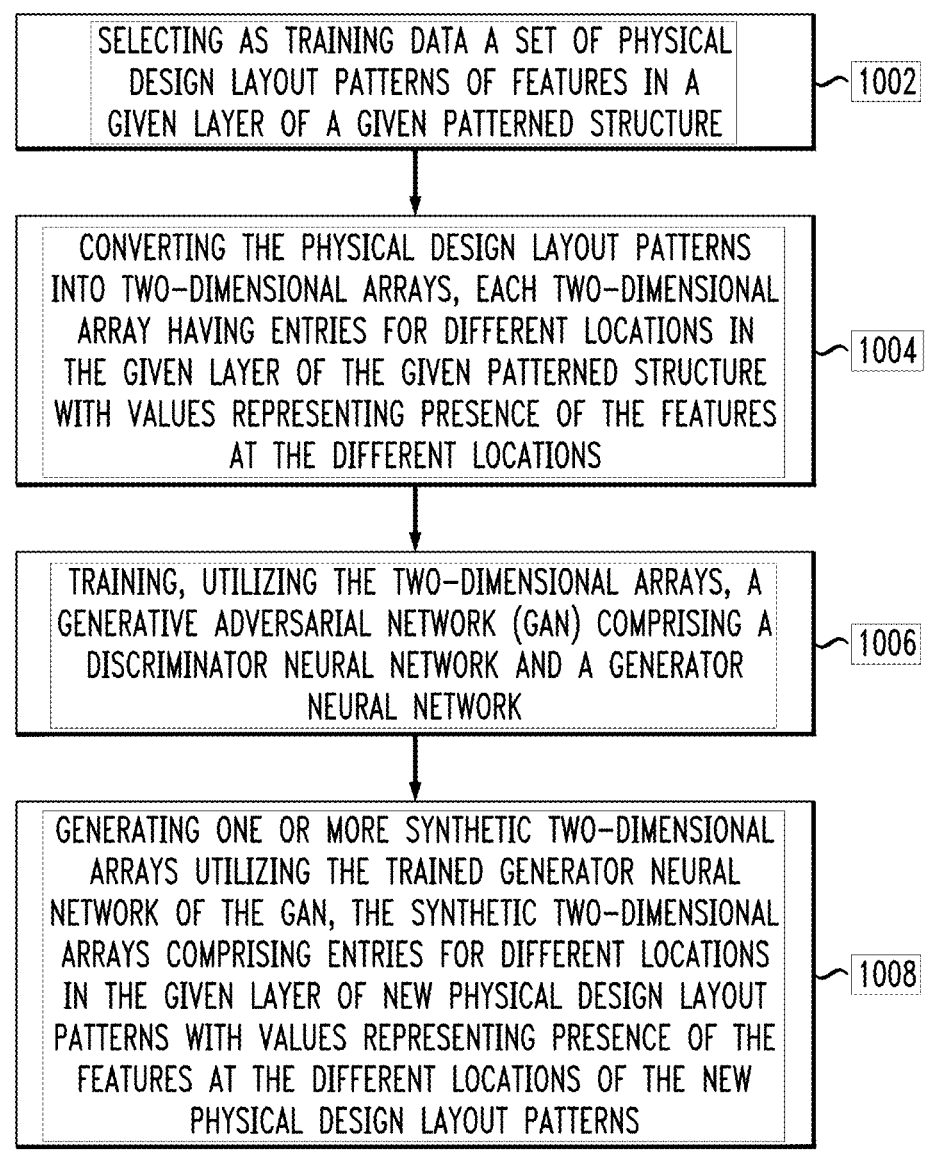
FIG. 10 depicts a workflow for generating synthetic single-layer physical design layout patterns, according to an exemplary embodiment of the present invention.

FIG. 10 shows a workflow 1000 for generating physical design layout patterns. The workflow 1000 begins with step 1002, selecting as training data a set of physical design layout patterns of features in a given layer of a given patterned structure. The features of the given patterned structure may be metal lines, vias or other types of features. In some embodiments, the set of physical design layout patterns selected as the training data includes a first set of physical design layout patterns having the features aligned primarily in a first direction and a second set of physical design layout patterns having the features aligned primarily in a second direction. The first direction may be a horizontal direction and the second direction may be a vertical direction.

In step 1004, the physical design layout patterns are converted into 2D arrays. Each 2D array may comprise entries for different locations in the given layer of the given patterned structure with values representing presence of the features at the different locations for a corresponding physical design layout pattern. The 2D arrays may have a size of W×H, where W represents a width of a field of view of the given layer of the given physical design layout pattern and H represents a height of the field of view. Step 1004 may include capturing images of the physical design layout patterns from an overall physical design layout, and converting the captured images to the 2D arrays. The captured images may be black-and-white images, and the entries of the 2D arrays may include binary values representing presence or absence of the features at the different locations in the given layer.

In step 1006, the 2D arrays utilized to train a GAN, the GAN including a discriminator neural network and a generator neural network. The discriminator neural network may be a CNN including an input layer, a series of one or more convolutional layers, batch normalization and L-ReLU activation functions; a fully connected layer; and a softmax output layer. The 2D arrays from step 1004 are provided to the input layer of the discriminator neural network. The generator neural network may also be a CNN including an input layer, a projection layer, a series of deconvolutional layers and an output layer. The input layer of the generator neural network receives a noise vector and the output layer of the generator neural network provides synthetic 2D arrays generated in step 1008.

In step 1008, synthetic 2D arrays are generated utilizing the trained generator neural network of the GAN. The synthetic 2D arrays have entries for different locations in the given layer of new physical design layout patterns with values representing presence of the features at the different locations of the new physical design layout patterns. As described above, the set of physical design layout patterns selected as training data in step 1002 may include first and second sets of physical design layout patterns with the features aligned primarily in first and second directions, respectively. The new physical design layout patterns of the synthetic 2D arrays generated in step 1008 include first sets of the features aligned in the first direction and second sets of the features aligned in the second direction.

In some embodiments, the physical design layout patterns selected in step 1002 are in a layout format supported by an EDA software, such as a layout format that includes coordinates of polygons representing the features in the given layer of the physical design layout patterns. Step 1004 may thus include converting the layout format to the 2D arrays. Step 1008 may also include converting the synthetic 2D arrays to the layout format (e.g., translating values of the synthetic 2D arrays to coordinates of vertices of polygons of the features in the given layer of the new physical design layout patterns). Step 1008 may further include applying post-processing using one or more design rule checks, and removing one or more rule-violating shapes. The synthetic 2D arrays generated in step 1008, after conversion to the layout format, may be used to evaluate manufacturability of the new physical design layout patterns.

Embodiments of the present invention include a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 11:
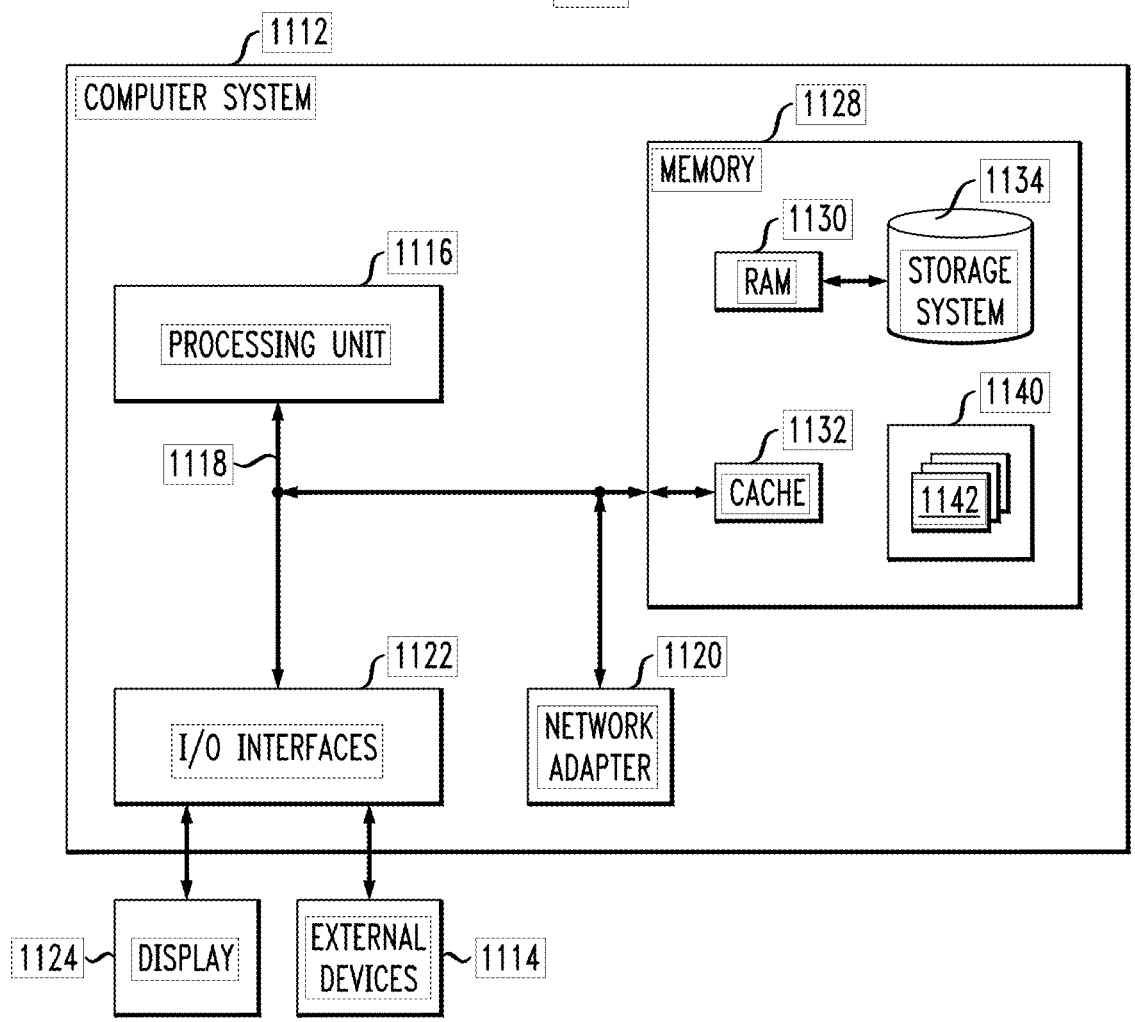
FIG. 11 depicts a computer system in accordance with which one or more components/steps of techniques of the invention may be implemented, according to an exemplary embodiment of the invention.

One or more embodiments can make use of software running on a general-purpose computer or workstation. With reference to FIG. 11, in a computing node 1110 there is a computer system/server 1112, which is operational with numerous other general purpose or special purpose computing system environments or configurations. Examples of well-known computing systems, environments, and/or configurations that may be suitable for use with computer system/server 1112 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, mobile and wearable devices, and distributed cloud computing environments that include any of the above systems or devices, and the like.

Computer system/server 1112 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1112 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 1112 in computing node 1110 is shown in the form of a general-purpose computing device. The components of computer system/server 1112 may include, but are not limited to, one or more processors or processing units 1116, a system memory 1128, and a bus 1118 that couples various system components including system memory 1128 to processor 1116.

The bus 1118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 1112 typically includes a variety of computer system readable media. Such media may be any available media that is accessible by computer system/server 1112, and it includes both volatile and non-volatile media, removable and non-removable media.

The system memory 1128 can include computer system readable media in the form of volatile memory, such as random access memory (RAM) 1130 and/or cache memory 1132. The computer system/server 1112 may further include other removable/non-removable, volatile/nonvolatile computer system storage media. By way of example only, storage system 1134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1118 by one or more data media interfaces. As depicted and described herein, the memory 1128 may include at least one program product having a set (e.g., at least one) of program modules that are configured to carry out the functions of embodiments of the invention. A program/utility 1140, having a set (at least one) of program modules 1142, may be stored in memory 1128 by way of example, and not limitation, as well as an operating system, one or more application programs, other program modules, and program data. Each of the operating system, one or more application programs, other program modules, and program data or some combination thereof, may include an implementation of a networking environment. Program modules 1142 generally carry out the functions and/or methodologies of embodiments of the invention as described herein.

Computer system/server 1112 may also communicate with one or more external devices 1114 such as a keyboard, a pointing device, a display 1124, etc., one or more devices that enable a user to interact with computer system/server 1112, and/or any devices (e.g., network card, modem, etc.) that enable computer system/server 1112 to communicate with one or more other computing devices. Such communication can occur via I/O interfaces 1122. Still yet, computer system/server 1112 can communicate with one or more networks such as a LAN, a general WAN, and/or a public network (e.g., the Internet) via network adapter 1120. As depicted, network adapter 1120 communicates with the other components of computer system/server 1112 via bus 1118. It should be understood that although not shown, other hardware and/or software components could be used in conjunction with computer system/server 1112. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
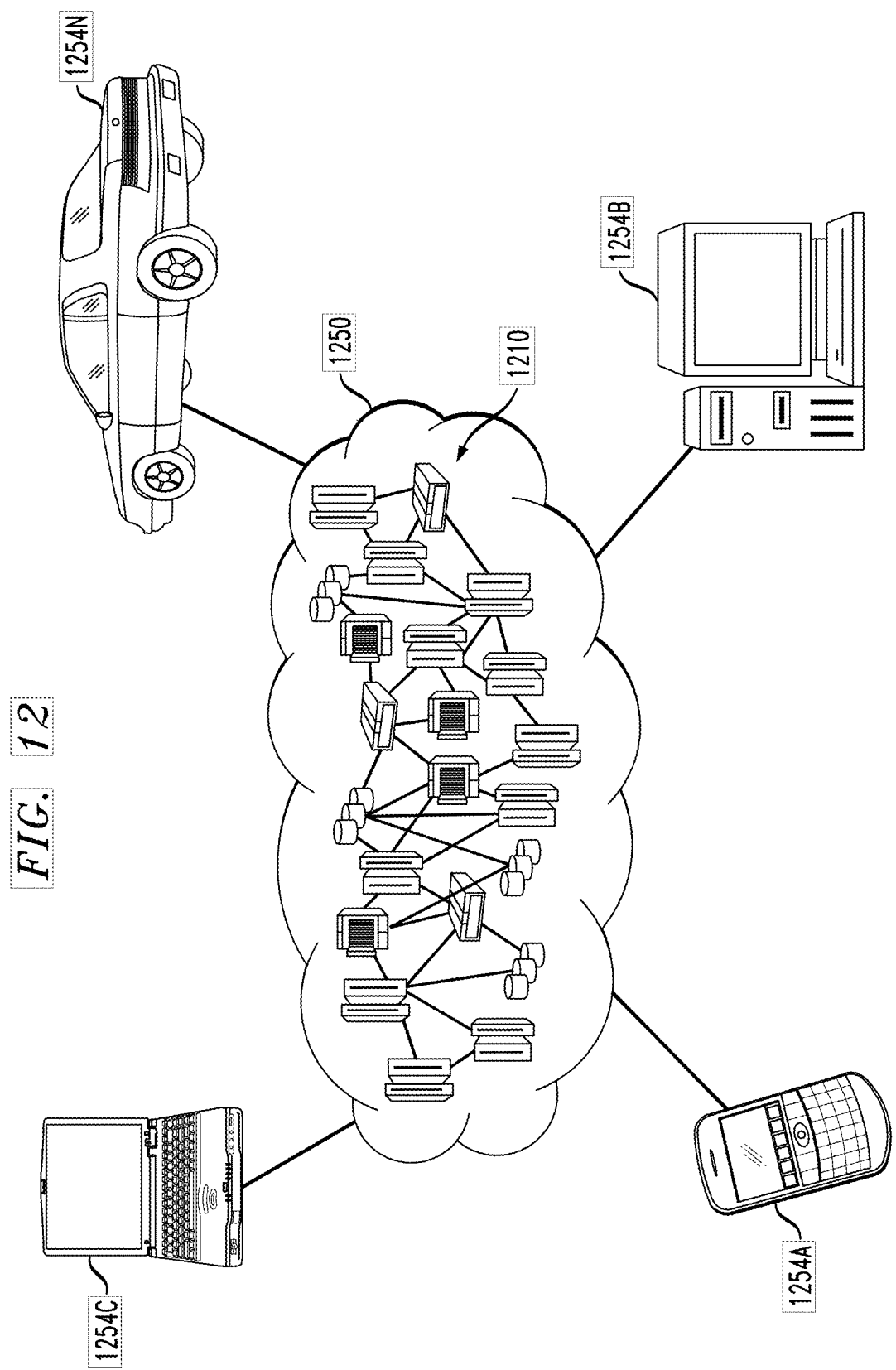
FIG. 12 depicts a cloud computing environment, according to an exemplary embodiment of the present invention.

Referring now to FIG. 12, illustrative cloud computing environment 1250 is depicted. As shown, cloud computing environment 1250 includes one or more cloud computing nodes 1210 with which local computing devices used by cloud consumers, such as, for example, personal digital assistant (PDA) or cellular telephone 1254A, desktop computer 1254B, laptop computer 1254C, and/or automobile computer system 1254N may communicate. Nodes 1210 may communicate with one another. They may be grouped (not shown) physically or virtually, in one or more networks, such as Private, Community, Public, or Hybrid clouds as described hereinabove, or a combination thereof. This allows cloud computing environment 1250 to offer infrastructure, platforms and/or software as services for which a cloud consumer does not need to maintain resources on a local computing device. It is understood that the types of computing devices 1254A-N shown in FIG. 12 are intended to be illustrative only and that computing nodes 1210 and cloud computing environment 1250 can communicate with any type of computerized device over any type of network and/or network addressable connection (e.g., using a web browser).

Figure 13:
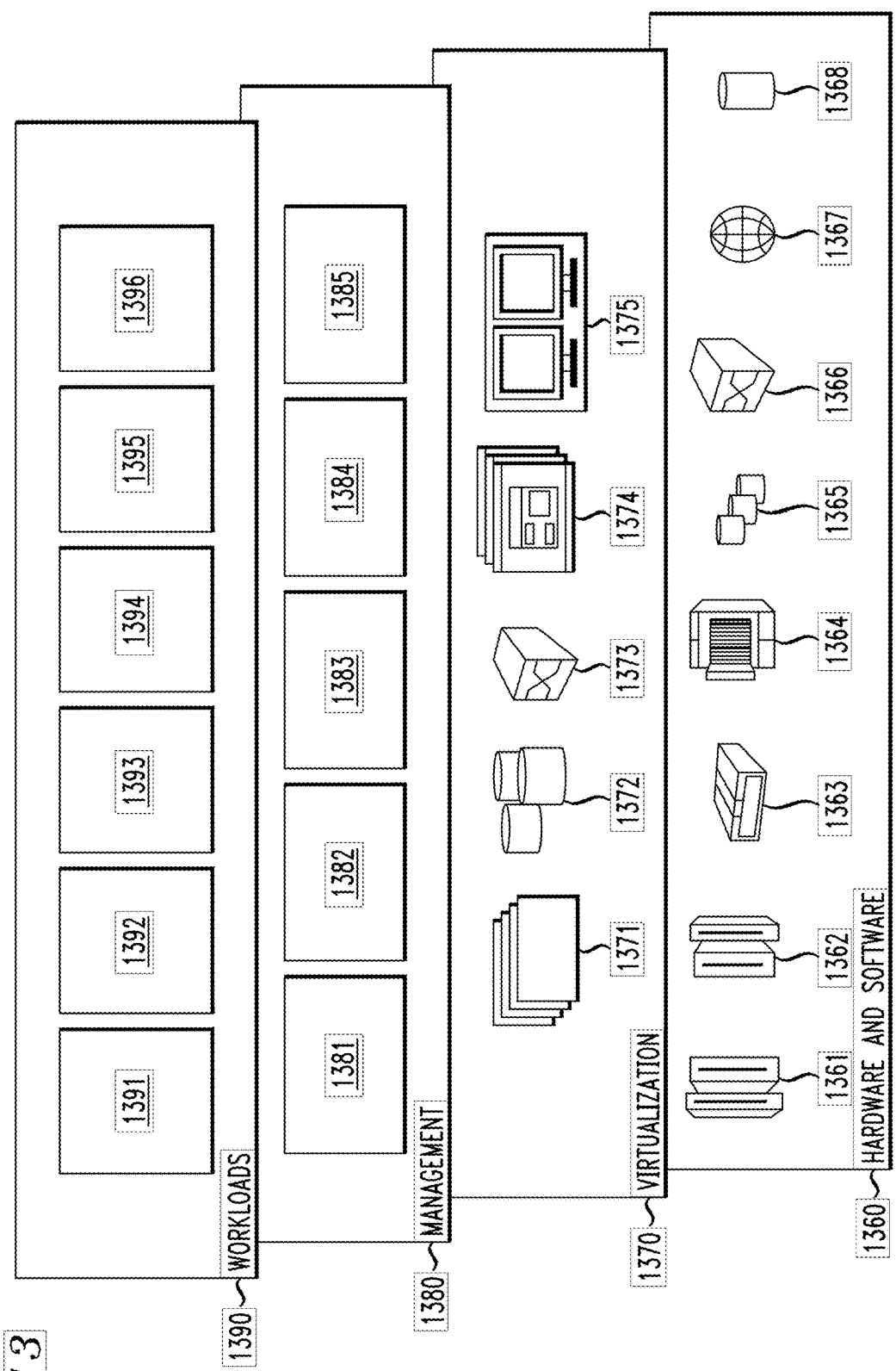
FIG. 13 depicts abstraction model layers, according to an exemplary embodiment of the present invention.

Referring now to FIG. 13, a set of functional abstraction layers provided by cloud computing environment 1250 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 1360 includes hardware and software components. Examples of hardware components include: mainframes 1361; RISC (Reduced Instruction Set Computer) architecture based servers 1362; servers 1363; blade servers 1364; storage devices 1365; and networks and networking components 1366. In some embodiments, software components include network application server software 1367 and database software 1368.

Virtualization layer 1370 provides an abstraction layer from which the following examples of virtual entities may be provided: virtual servers 1371; virtual storage 1372; virtual networks 1373, including virtual private networks; virtual applications and operating systems 1374; and virtual clients 1375.

In one example, management layer 1380 may provide the functions described below. Resource provisioning 1381 provides dynamic procurement of computing resources and other resources that are utilized to perform tasks within the cloud computing environment. Metering and Pricing 1382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1383 provides access to the cloud computing environment for consumers and system administrators. Service level management 1384 provides cloud computing resource allocation and management such that required service levels are met. Service Level Agreement (SLA) planning and fulfillment 1385 provide pre-arrangement for, and procurement of, cloud computing resources for which a future requirement is anticipated in accordance with an SLA.

Workloads layer 1390 provides examples of functionality for which the cloud computing environment may be utilized. Examples of workloads and functions which may be provided from this layer include: mapping and navigation 1391; software development and lifecycle management 1392; virtual classroom education delivery 1393; data analytics processing 1394; transaction processing 1395; and synthetic physical design layout pattern generation processing 1396, which may perform various functions described above with respect to generating synthetic physical design layout patterns using the techniques described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for generating physical design layout patterns, comprising steps of:
    selecting as training data a set of physical design layout patterns of features in a given layer of a given patterned structure;
    converting the physical design layout patterns into two-dimensional arrays, a given two-dimensional array for a given physical design layout pattern comprising entries for different locations in the given layer of the given patterned structure with values representing presence of the features at the different locations;
    training, utilizing the two-dimensional arrays, a generative adversarial network (GAN) comprising a discriminator neural network and a generator neural network; and
    generating one or more synthetic two-dimensional arrays utilizing the trained generator neural network of the GAN, a given one of the synthetic two-dimensional arrays comprising entries for different locations in the given layer of a new physical design layout pattern with values representing presence of the features at the different locations of the new physical design layout pattern;
    wherein the set of physical design layout patterns selected as the training data comprises a first set of physical design layout patterns having the features aligned primarily in a first direction and a second set of physical design layout patterns having the features aligned primarily in a second direction;
    wherein the new physical design layout pattern has a first set of the features aligned in the first direction and a second set of the features aligned in the second direction; and
    wherein the method is performed by at least one processing device comprising a processor coupled to a memory.

2. The method of claim 1, wherein the first direction comprises a horizontal direction and the second direction comprises a vertical direction.

3. The method of claim 1, wherein the features of the given patterned structure comprise metal lines.

4. The method of claim 1, wherein the feature of the given patterned structure comprise vias.

5. The method of claim 1, wherein the given two-dimensional array has a size of W×H, where W represents a width of a field of view of the given layer of the given physical design layout pattern and H represents a height of the field of view.

6. The method of claim 1, wherein converting the physical design layout patterns into the two-dimensional arrays comprises, for the given physical design layout pattern, capturing an image of the given physical design layout pattern from a physical design layout and converting the captured image to the given two-dimensional array.

7. The method of claim 6, wherein the captured image comprises a black-and-white image, and wherein the entries of the given two-dimensional array comprise binary values representing presence or absence of the features at the different locations in the given layer.

8. The method of claim 1, wherein the discriminator neural network comprises a convolutional neural network.

9. The method of claim 8, wherein the convolutional neural network comprises: an input layer; a series of one or more convolutional layers, batch normalization and leaky rectified linear unit (L-ReLU) activation functions; a fully connected layer; and a softmax output layer.

10. The method of claim 9, wherein the two-dimensional arrays are provided to the input layer.

11. The method of claim 1, wherein the generator neural network comprises an input layer, a projection layer, a series of deconvolutional layers and an output layer.

12. The method of claim 11, wherein the input layer receives a noise vector and the output layer provides the synthetic two-dimensional arrays.

13. The method of claim 1, wherein the given physical design layout pattern is in a layout format supported by an electronic design automation (EDA) software, the layout format comprising coordinates of polygons representing the features in the given layer of the given physical design layout pattern.

14. The method of claim 13, wherein converting the physical design layout patterns into the two-dimensional arrays comprises, for the given physical design layout pattern, converting the layout format of the given physical design layout pattern to the given two-dimensional array.

15. The method of claim 1, further comprising converting the synthetic two-dimensional arrays to a layout format supported by an electronic design automation (EDA) software.

16. The method of claim 15, wherein converting the synthetic two-dimensional arrays to the layout format supported by the EDA software comprises, for the given synthetic two-dimensional array, translating values of the given synthetic two-dimensional array to coordinates of vertices of polygons of the features in the given layer of the new physical design layout pattern.

17. The method of claim 15, further comprising applying post-processing using one or more design rule checks.

18. The method of claim 15, further comprising applying post-processing to remove one or more rule-violating shapes.

19. The method of claim 15, further comprising utilizing the given synthetic two-dimensional array converted to the layout format to evaluate manufacturability of the new physical design layout pattern.

20. The method of claim 1, wherein the set of physical design layout patterns selected as the training data comprises a first amount of physical design layout patterns in the first set having the features primarily aligned in the first direction and a second amount of physical design layout patterns in the second set having the features primarily aligned in the second direction, the first amount being different than the second amount such that the new physical design layout pattern has different relative amounts of features in the first set aligned in the first direction and the second set aligned in the second direction.

21. A computer program product, the computer program product comprising a non-transitory computer readable storage medium having program instructions embodied therewith, the program instructions executable by at least one computing device to cause the at least one computing device to perform steps of:

selecting as training data a set of physical design layout patterns of features in a given layer of a given patterned structure;

converting the physical design layout patterns into two-dimensional arrays, a given two-dimensional array for a given physical design layout pattern comprising entries for different locations in the given layer of the given patterned structure with values representing presence of the features at the different locations;

training, utilizing the two-dimensional arrays, a generative adversarial network (GAN) comprising a discriminator neural network and a generator neural network; and generating one or more synthetic two-dimensional arrays utilizing the trained generator neural network of the GAN, a given one of the synthetic two-dimensional arrays comprising entries for different locations in the given layer of a new physical design layout pattern with values representing presence of the features at the different locations of the new physical design layout pattern;

wherein the set of physical design layout patterns selected as the training data comprises a first set of physical design layout patterns having the features aligned primarily in a first direction and a second set of physical design layout patterns having the features aligned primarily in a second direction; and wherein the new physical design layout pattern has a first set of the features aligned in the first direction and a second set of the features aligned in the second direction.

22. The computer program product of claim 21, wherein the set of physical design layout patterns selected as the training data comprises a first amount of physical design layout patterns in the first set having the features primarily aligned in the first direction and a second amount of physical design layout patterns in the second set having the features primarily aligned in the second direction, the first amount being different than the second amount such that the new physical design layout pattern has different relative amounts of features in the first set aligned in the first direction and the second set aligned in the second direction.

23. An apparatus comprising:
a memory; and
at least one processor coupled to the memory and configured for:

selecting as training data a set of physical design layout patterns of features in a given layer of a given patterned structure;

converting the physical design layout patterns into two-dimensional arrays, a given two-dimensional array for a given physical design layout pattern comprising entries for different locations in the given layer of the given patterned structure with values representing presence of the features at the different locations;

training, utilizing the two-dimensional arrays, a generative adversarial network (GAN) comprising a discriminator neural network and a generator neural network; and generating one or more synthetic two-dimensional arrays utilizing the trained generator neural network of the GAN, a given one of the synthetic two-dimensional arrays comprising entries for different locations in the given layer of a new physical design layout pattern with values representing presence of the features at the different locations of the new physical design layout pattern;

wherein the set of physical design layout patterns selected as the training data comprises a first set of physical design layout patterns having the features aligned primarily in a first direction and a second set of physical design layout patterns having the features aligned primarily in a second direction; and wherein the new physical design layout pattern has a first set of the features aligned in the first direction and a second set of the features aligned in the second direction.

24. The apparatus of claim 23, wherein the set of physical design layout patterns selected as the training data comprises a first amount of physical design layout patterns in the first set having the features primarily aligned in the first direction and a second amount of physical design layout patterns in the second set having the features primarily aligned in the second direction, the first amount being different than the second amount such that the new physical design layout pattern has different relative amounts of features in the first set aligned in the first direction and the second set aligned in the second direction.

25. The apparatus of claim 23, wherein the first direction comprises a horizontal direction and the second direction comprises a vertical direction.

* * * * *